March 14, 1961 V. M. ZWICKER 2,975,007
SELF-ALIGNING BEARING MOUNTING
Filed Nov. 14, 1958
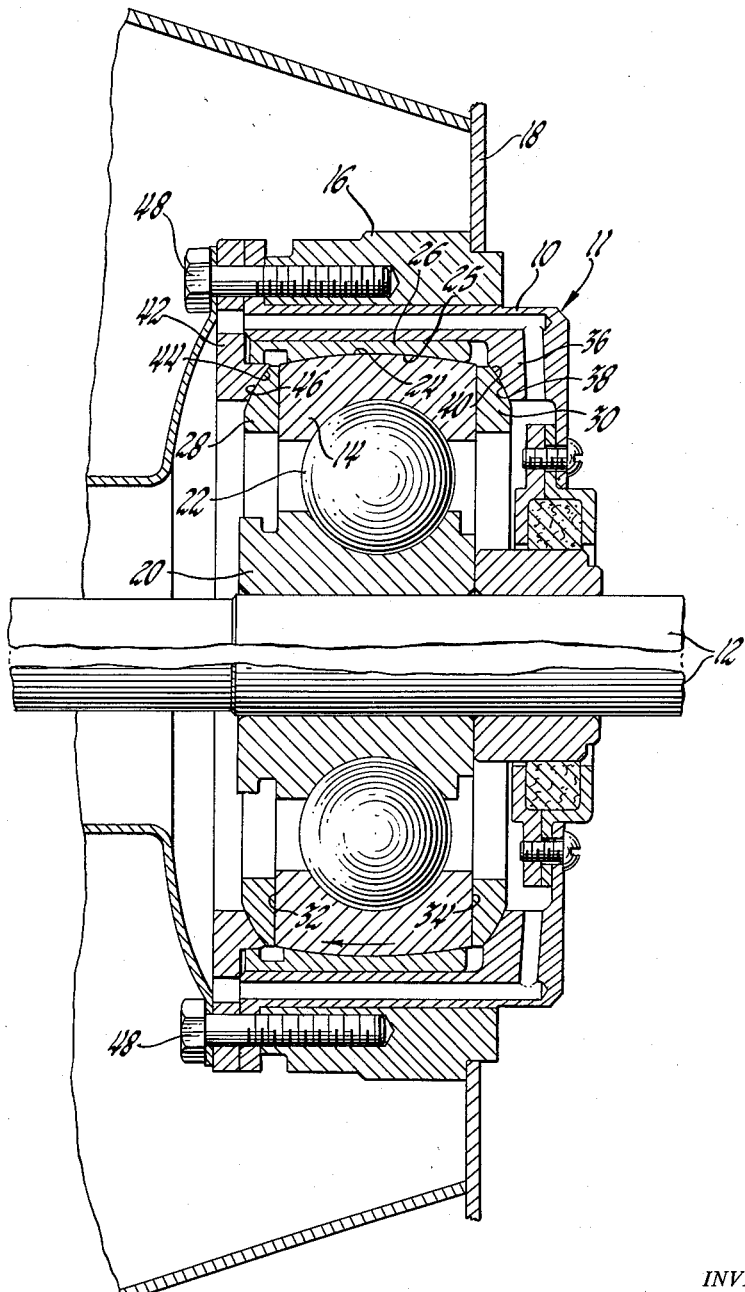
INVENTOR.
Vernon M. Zwicker
BY
R. R. Barnard
ATTORNEY

United States Patent Office 2,975,007
Patented Mar. 14, 1961

2,975,007

SELF-ALIGNING BEARING MOUNTING

Vernon M. Zwicker, Indianapolis, Ind., assignor to General Motors Corporation, Detroit, Mich., a corporation of Delaware Filed Nov. 14, 1958, Ser. No. 774,030

5 Claims. (Cl. 308—194)

The present invention relates to an improved self-aligning bearing mounting of the type in which the outer surface of the bearing outer ring is of a spherical cross section and seats within a spherical supporting member. In the past self-aligning bearing mountings of this type have been limited largely to cylindrical roller bearings where the thrust loads are only due to misalignment, and generally, in addition, oil under pressure is supplied between the spherical surfaces. Since the shaft misalignment thrust loads plus an imposed external thrust load on a ball thrust bearing are sometimes rather severe, the results would be to create a wedging action between the spherical surfaces which would distort the sphericity of the mating parts, thereby impairing the self-aligning function of the mounting and resulting ultimately in the bearing's destruction.

In the present invention a unique thrust washer arrangement has been provided in such a way that the shaft misalignment thrust forces plus imposed thrust forces are not absorbed by the spherical surfaces on the bearing outer ring and its supporting structure. Such forces are instead transmitted to members better able to withstand such loads. More specifically, the present invention includes a pair of annular thrust washers which are generally diametrically coextensive with the outer ring member and adapted to seat against the side faces of said ring member. The annular thrust washers are, in turn, adapted to cooperate with correspondingly shaped thrust members mounted on or formed integrally with the outer ring supporting structure and the bearing misalignment thrust forces transmitted directly thereto.

The mating surfaces on the annular thrust washers and the bearing support structure member have a slight spherical curvature such that when the bearing is rotated, due to shaft misalignment, each thrust washer is displaced into an eccentric relation with respect to the rotative axis of the bearing. The thrust washer and bearing construction is such that bearing alignment movement causes equal but opposite eccentric displacements of the thrust washers. In other words, if the outer ring is rotated in such a way as to displace one of the thrust washers downwardly, this same motion will cause the other thrust washer to be moved upwardly in the same amount. This type of thrust washer relationship insures that the overall bearing will remain relatively aligned notwithstanding the misalignment imposed thereon.

The details as well as other objects and advantages of the present invention will be apparent from a perusal of the detailed description which follows.

The drawing shows a self-aligning bearing mounting embodying the subject invention.

A bearing is shown generally at 11 and is adapted to rotatably support a shaft element 12 of the type likely to be subjected to slight deflections in operation. While the subject invention is of general applicability, it has found particular utility when used with the turbine shaft of a jet type engine where shaft deflections are frequently encountered.

The outer ring 14 of bearing 11 is retained by support member 10 which is in turn rigidly fixed to the welded structures 16 and 18 of the engine frame. The inner ring 20 is secured in any well known manner to shaft 12 for rotation therewith. Inner ring 20 is rotatably supported upon bearing members 22 in the normal manner.

As already suggested, slight angular deflections of the shaft 12 are common and means must be provided to accommodate the same to prevent destruction of the bearing. To this end, the outer peripheral surface 24 of outer ring 14 is of spherical cross section and is adapted to coact with a similarly shaped surface 25 on member 26 supported within member 10. The center of the sphere which includes surfaces 24 and 25 is coincident with the geometrical center of bearing 11. Thus, as any angular deflections of the shaft 12 takes place, as indicated by the arrow on the outer ring, the outer ring will rotate relative to the supporting members 26 and 10 and in so doing maintain the bearing in the proper, i.e. normal, angular attitude with respect to the shaft, thereby eliminating non-uniform bearing loads. This type of bearing construction is generally well known in the roller bearing art. However, it can be shown that with ball thrust bearings so constructed, the imposed thrust loads on the outer ring member 14 and the coacting supporting member 26 would be such as to cause a wedging action between coacting surfaces 24 and 25 of these members, resulting in tight wedging so that the thrust forces induced by shaft misalignment would be inoperative in realigning the bearing, and would result ultimately in a bearing failure.

The present invention provides a unique construction in which the thrust forces are not taken by the spherical surfaces 24 and 25 of outer ring 14 and its supporting member 26, but instead are transmitted through thrust washers or rings 28 or 30 to support members 42 or 10, respectively, depending upon the direction of imposed thrust. The bearing outer ring 14 and the two thrust washers 28 and 30 have a slight clearance between the surfaces 38 and 44. The thrust washers and the members cooperating therewith have been designed in such a way that such washers are displaced during the aforenoted shaft deflection so as not to interfere with proper bearing alignment but at the same time maintaining a continuous and uniform contact between the bearing and its supporting member.

Thrust washer members 28 and 30 are of identical construction and accordingly are interchangeable. The thrust washers are of annular construction and are adapted to respectively engage the side faces 32 and 34 of outer ring 14. Bearing support member 10 has an annular extension or flange 36 formed thereon which extends axially beyond the main body of the member and partially encloses outer ring 14. Flange portion 36 includes a surface 38 adapted to coact with a correspondingly shaped surface 40 on thrust washer 30.

In order to permit assembly of bearing 11 within the support member 10 an annular retainer ring 42 is secured to the support member 16 and includes a surface 44 adapted to coact with the correspondingly shaped face 46 on thrust washer 28. Thus the bearing is assembled by removing annular ring 42, inserting the thrust washer 30, bearing 11, thrust washer 28 and then securing the ring 42 to the support member through the suitably provided cap screw members 48.

The coacting surfaces 40 and 38 of the annular thrust washer 30 and flange portion 36 are actually of spherical section and have coincident centers. The coincident center of spherical surfaces 38 and 40 is offset from the geometrical center of bearing 11. As a consequence of this eccentric relationship as bearing 11 is rotated, as indicated by the arrow, through deflection of shaft 12, thrust washer 30 is displaced downwardly. At the same time, thrust washed 28 is displaced upwardly.

Since the amount of shaft deflection contemplated is very small, e.g. on the order of one degree or less, the slight radial displacement of thrust washers 28 and 30 relative to fixed support surfaces 44 and 38 leaves the thrust carrying areas substantially constant. In this way both the shaft deflection thrust forces and the imposed thrust loads are transmitted to the supporting member 10 rather than being taken upon the spherical bearing aligning surfaces 24 and 25. Consequently, a structure giving good support to the bearing as well as permitting free alignment is realized since the bearing is at all times in substantially full engagement with its supporting structure through thrust washers 28 and 30.

It is apparent that various structural modifications may be made in the illustrated bearing assembly within the scope of the invention as set forth in the hereinafter appended claims.

I claim:

1. A self-aligning bearing of the type adapted to rotatably support a shaft member, said bearing comprising an inner race member fixed for rotation with said shaft member, an outer race, a plurality of bearing elements mounted between said inner and outer races to permit relative rotation therebetween, a member adapted to support said outer race, said support member and said outer raceway having coacting surfaces of spherical cross section permitting said outer race to rotate relative to said supporting member during deflection of said shaft, said outer race member including a pair of axially spaced side faces perpendicularly disposed to the rotative axis of said bearing, said support member including a pair of thrust surfaces disposed adjacent to the side faces of said outer race member and axially spaced therefrom, and a pair of thrust rings concentrically disposed with respect to said shaft and including a portion thereof adapted to extend within the space between said outer race side faces and said support member thrust faces, said rings being in continuous engagement with said side faces and said thrust faces, said rings and thrust faces being so formed that relative rotation of said outer raceway relative to said supporting member will displace said rings into eccentric thrust transmitting relationship with said shaft.

2. A self-aligning bearing of the type adapted to rotatably support a shaft member, said bearing comprising an inner race member fixed for rotation with said shaft member, an outer race, a plurality of bearing elements mounted between said inner and outer races to permit relative rotation therebetween, a member adapted to support said outer race, said support member and said outer raceway having coacting surfaces of spherical cross section permitting said outer race to rotate relative to said supporting member during deflection of said shaft, said outer race member including a pair of axially spaced radial side faces, said support member including a pair of annular thrust surfaces of spherical cross section disposed adjacent the radial faces of said outer race member and axially spaced therefrom, and a pair of thrust rings including a portion thereof extending between said radial faces and said support member thrust faces, said rings including radial faces in continuous engagement with the radial faces of the outer race and spherical faces engaging the thrust faces of the support member, relative rotation of said outer race relative to said supporting member causing equal and opposite displacements of the thrust rings relative to the support member and maintaining substantially constant surface contact between the coacting spherical faces of the rings and support member.

3. A self-aligning bearing as set forth in claim 2 in which the centers of the spherical faces of the thrust rings and the support member are coincident under all shaft deflection conditions.

4. A self-aligning bearing assembly of the type adapted to rotatably support a shaft member comprising an inner race fixed for rotation with said shaft, an outer race having axially spaced side faces, a plurality of bearing elements disposed between said raceways to permit relative rotation between said races, the radially outer surface of said outer race being of convex spherical cross section, a member for radially supporting said outer race, said support member including a radially inner surface of concave spherical cross section adapted to coact with said convex outer race surface to permit limited rotation of said outer race relative to said support member due to deflection of said shaft, said support member including a pair of annular spherical thrust faces disposed on opposite sides of the outer race and respectively axially spaced from said race side faces, and a pair of annular thrust rings concentrically disposed about said shaft and including corresponding annular spherical thrust faces extending within the space between said support member and the side faces of said outer race, the respective coacting annular spherical faces of the support member and thrust rings being in continuous surface contact, deflection rotation of said outer raceway relative to said supporting structure being adapted to eccentrically displace said thrust rings relative to the rotative axis of said shaft, the eccentricity of said thrust rings being opposite, the coacting spherical thrust faces of the thrust rings and support member maintaining substantially constant surface contact during said eccentric displacement.

5. A self-aligning bearing assembly as set forth in claim 4 in which the centers of said convex and concave surfaces being coincident with the geometrical center of the bearing assembly, and the centers of the coacting thrust ring and support member spherical faces being coincident.

References Cited in the file of this patent

UNITED STATES PATENTS

| | | |
|---|---|---|
| 1,205,539 | Hirth | Nov. 21, 1916 |
| 1,265,230 | Miller | May 7, 1918 |

FOREIGN PATENTS

| | | |
|---|---|---|
| 389,737 | France | July 8, 1908 |
| 25,138 | Great Britain | of 1913 |